United States Patent
Blaha

(10) Patent No.: US 7,482,711 B2
(45) Date of Patent: Jan. 27, 2009

(54) AUXILIARY POWER SWITCHING ARRANGEMENT FOR PCI EXPRESS, PC'S AND SIMILAR APPLICATIONS

(75) Inventor: Matthew Blaha, Holmdel, NJ (US)

(73) Assignee: Agere Systems Inc., Allentown, PA (US)

( * ) Notice: Subject to any disclaimer, the term of this patent is extended or adjusted under 35 U.S.C. 154(b) by 325 days.

(21) Appl. No.: 11/174,846

(22) Filed: Jul. 5, 2005

(65) Prior Publication Data
US 2006/0076943 A1 Apr. 13, 2006

Related U.S. Application Data

(60) Provisional application No. 60/614,961, filed on Sep. 30, 2004.

(51) Int. Cl.
*H02J 1/00* (2006.01)
*H02J 3/00* (2006.01)

(52) U.S. Cl. .......................... 307/80; 307/85
(58) Field of Classification Search .............. 307/80, 307/85, 72
See application file for complete search history.

(56) References Cited

U.S. PATENT DOCUMENTS

| 5,412,716 | A | | 5/1995 | Blaha | |
|---|---|---|---|---|---|
| 5,559,423 | A | * | 9/1996 | Harman | ...................... 323/277 |
| 5,752,046 | A | | 5/1998 | Oprescu et al. | |
| 5,864,225 | A | | 1/1999 | Bryson | |
| 5,898,844 | A | * | 4/1999 | Thompson | .................. 710/302 |
| 6,462,926 | B1 | * | 10/2002 | Zaretsky et al. | ............. 361/103 |
| 6,513,128 | B1 | | 1/2003 | Wang et al. | |
| 6,560,713 | B1 | | 5/2003 | Chary | |
| 6,580,710 | B1 | | 6/2003 | Bowen et al. | |
| 6,681,335 | B1 | | 1/2004 | Rice et al. | |
| 6,780,018 | B1 | | 8/2004 | Shipe | |
| 6,800,962 | B2 | * | 10/2004 | Bahl et al. | ..................... 307/52 |
| 7,221,106 | B1 | * | 5/2007 | Nemir et al. | ................. 315/291 |
| 2002/0141492 | A1 | | 10/2002 | Blaha | |
| 2004/0217653 | A1 | * | 11/2004 | Neidorff | ...................... 307/80 |
| 2005/0022035 | A1 | | 1/2005 | Hsu | |
| 2005/0022036 | A1 | | 1/2005 | Hsu | |
| 2005/0034045 | A1 | | 2/2005 | Lueck et al. | |
| 2005/0060587 | A1 | | 3/2005 | Hwang et al. | |

OTHER PUBLICATIONS

Jim Renehan, "Power Issues in Edge Card Systems" Trenton Technology.
Realtek, "Single-Chip Gigabit LOM Ethernet Controller for PCI Express".
Trentonprocessors, "PCI Express Serial Slots".
Expresscard, "Express Card™ Standard Summary".
Soft Mixed Signal "PCI-Express PIPE PHY Transceiver".
Texas Instruments "Dual-Slot PCI Hot-Plug Power Controller With I²C Interface".

* cited by examiner

*Primary Examiner*—Michael J Sherry
*Assistant Examiner*—Carlos Amaya

(57) ABSTRACT

A series pass transistor voltage regulator is described having a main power source and an auxiliary power source. When the main power source voltage falls to a level the regulator can no longer use, the regulator seamlessly draws power from the auxiliary source. A voltage dropping circuit of two series-coupled diodes allows for a single feedback control amplifier to control the regulator's pass transistors in series with the main and auxiliary power sources.

9 Claims, 2 Drawing Sheets

AUXILIARY POWER SWITCHING ARRANGEMENT FOR PCI EXPRESS, PC'S AND SIMILAR APPLICATIONS

CROSS-REFERENCE TO RELATED APPLICATIONS

This application claims the benefit of U.S. Provisional Application No. 60/614,961, filed Sep. 30, 2004.

TECHNICAL FIELD

The present invention relates to power supplies generally and, more particularly, to voltage regulators.

BACKGROUND OF THE INVENTION

Industry standards have been widely relied upon in the design and manufacture of a number of computer system components and functions. One particular example is computer bus architectures. Generally speaking, computer bus architectures are concerned with the interface and communication between processing, memory and input/output computer system components. One commonly-used bus interface is defined as "Peripheral Component Interconnect" (PCI). At the time it was developed, PCI was a very advanced, high-performance parallel bus standard. More recently, a newer bus standard has been developed to more fully utilize new communication technologies (e.g., packet-based, point-to-point communication). This standard is referred to as "PCI Express".

This newer PCI Express standard defines the auxiliary power (Vaux) to be at the same voltage level as the primary power supply. That is, the auxiliary power is defined as 3.3 Vaux, with the primary supply being +3.3V. The use of the same voltage levels makes it significantly more difficult to design a seamless Vaux switch mechanism for the PCI Express standard. In the prior PCI standard (PCI 2.2 in particular), the primary supply was maintained at a voltage level of 5.0 volts, with Vaux at 3.3 volts. There exists a variety of commercially-available products capable of providing relatively seamless switching between these two different power supplies. The ability to "seamlessly" switch (i.e., abruptly switching sources without any interruption in supplied voltage) to and from Vaux is an important capability for PCI Express add-in cards.

Prior art arrangements that are intended for the older PCI 2.2 standard typically add more circuitry, complexity and cost to the power supply by performing the primary/Vaux power supply switching as a stand-alone function on the power input lines. Moreover, existing prior art devices do not allow a voltage offset for the switch between the primary and Vaux power supplies while operating both rails at 3.3 volts. Such an offset is highly desirable in the PCI Express environment to ensure that the plug-in card operates on the correct supply at all times, even if the supplies are at the far limits of their respective tolerance ranges.

SUMMARY OF THE INVENTION

The need remaining in the prior art is addressed by the present invention, which relates to power supplies generally and, more particularly, to voltage regulators.

In accordance with the present invention, a voltage regulator is constructed to include a first pass transistor coupled between a first power supply node and the output, and a second pass transistor coupled between a second power supply node and the output. A differential amplifier is coupled between the output node and a control terminal of the first pass transistor, with a voltage dropping circuit connected between the output of the differential amplifier and a control terminal of the second pass transistor.

In one embodiment of the present invention, a closed-loop linear series voltage regulator coupled between the primary supply and the regulated output line is supplemented by a second series drop element disposed between the Vaux power supply and the same regulated output. One or more diodes are coupled between the primary control line and the Vaux control line to provide the desired voltage offset. In a particular arrangement, switching transistors are utilized as the series drop elements.

Various embodiments of the present invention may be formed in either bipolar or MOS technology, with additional components used to insure proper operation under a variety of different circumstances.

Other and further aspects and embodiments of the present invention will become apparent during the course of the following discussion and by reference to the accompanying drawings.

BRIEF DESCRIPTION OF THE DRAWINGS

Referring now to the drawings, where like numerals represent like elements in different embodiments.

DETAILED DESCRIPTION

Figure 1:
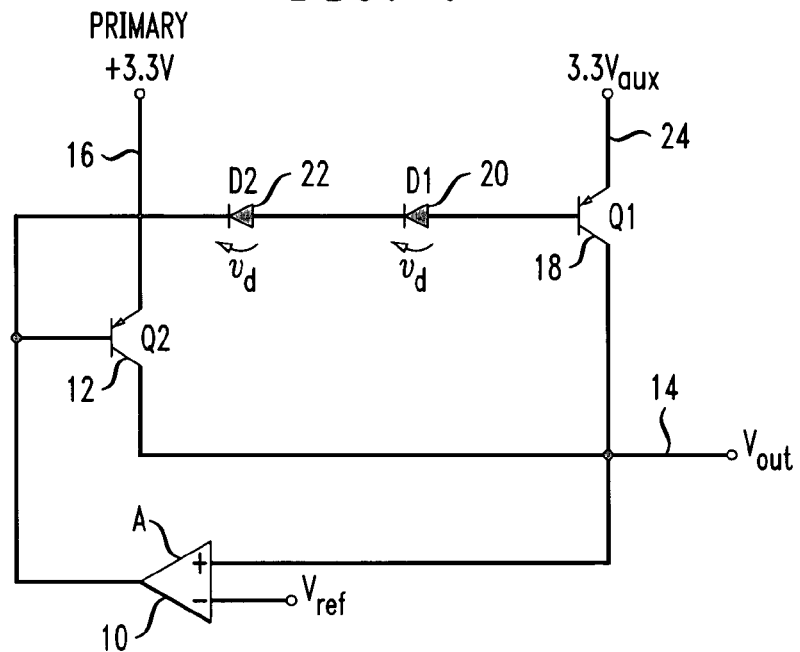
FIG. 1 illustrates a first embodiment of the present invention, utilizing a pair of diodes between the primary control line and the Vaux control line.

FIG. 1 illustrates a first embodiment of a switchable voltage regulator for PCI Express applications, formed in accordance with the present invention. As shown, a differential amplifier 10 and a first transistor 12 are coupled together to form a conventional closed-loop linear series voltage regulator to provide a substantially constant voltage output Vout along output voltage rail 14. In one particular embodiment, the Vout level may be approximately 1 volt. As shown, a reference voltage source, denoted Vref is applied as a first input to differential amplifier 10, with the remaining input being coupled to Vout. The output voltage from amplifier 10 is coupled to the base of first transistor 12 and used, as discussed below, as the control signal for the switching function of the present invention.

As shown, the emitter of first transistor 12 is coupled to primary voltage supply rail 16, where in the case of PCI-Express, the primary voltage is maintained at +3.3 volts. To complete the circuit, the collector of first transistor 12 is coupled to output voltage rail 14, supplying a voltage level of, for example, of 1 volt.

In accordance with the present invention, a second linear drop element, shown as transistor 18 and a pair of diodes 20, 22 are added to the voltage regulator to provide the desired Vaux switching function. As shown, second transistor 18 is connected between a Vaux voltage input supply rail 24 and Vout regulated voltage output rail 14. Diodes 20 and 22 are connected in series between the base of second transistor 18 and the base of first transistor 12. The voltage drop $v_d$ across each of these diodes (on the order of, for example, 0. 5 volts) is therefore sufficient to provide a voltage drop exceeding the 0.6 volt tolerance difference desired between the primary +3.3 volt source and the 3.3 Vaux source, with sufficient headroom remaining to control the power devices. It is to be understood that the use of a pair of such diodes is exemplary only, with more or less diodes or other voltage-dropping elements used (as necessary) to provide the desired amount of offset for the switching function.

As required by the PCI Express standard, if 3.3 Vaux is not present, the arrangement of FIG. 1 simply runs from primary rail 16, supplying the +3.3 voltage through first transistor 12 and into the Vout regulated output supply rail 14. In this mode, without Vaux present, second transistor 18 will be "off". In accordance with the teachings of the present invention, If/when the voltage along rail 16 drops below the level from which first transistor 12 can be regulated (i.e., "Vref"), the control signal output from amplifier 10 will abruptly drop by the voltage level associated with diodes 20 and 22, second transistor 18 will turn "on", and the regulation will begin through second transistor 18 from Vaux supply rail 24. The provision of the supply voltage from Vaux supply rail 24 still maintains the minimum dropout voltage provided by second transistor 18.

Once the +3.3 voltage level is regained along primary supply rail 16, the control signal output from amplifier 10 will increase, following the increase along primary supply rail 16 and regulation will seamlessly be resumed again through first transistor 12, with second transistor 18 simultaneously turning "off". Thus, in accordance with the teachings of the present invention, the utilization of the switching transistors and diode drops, in combination with the closed-loop voltage regulator, allows for seamless transition between the primary voltage supply and the Vaux power supply.

Figure 2:
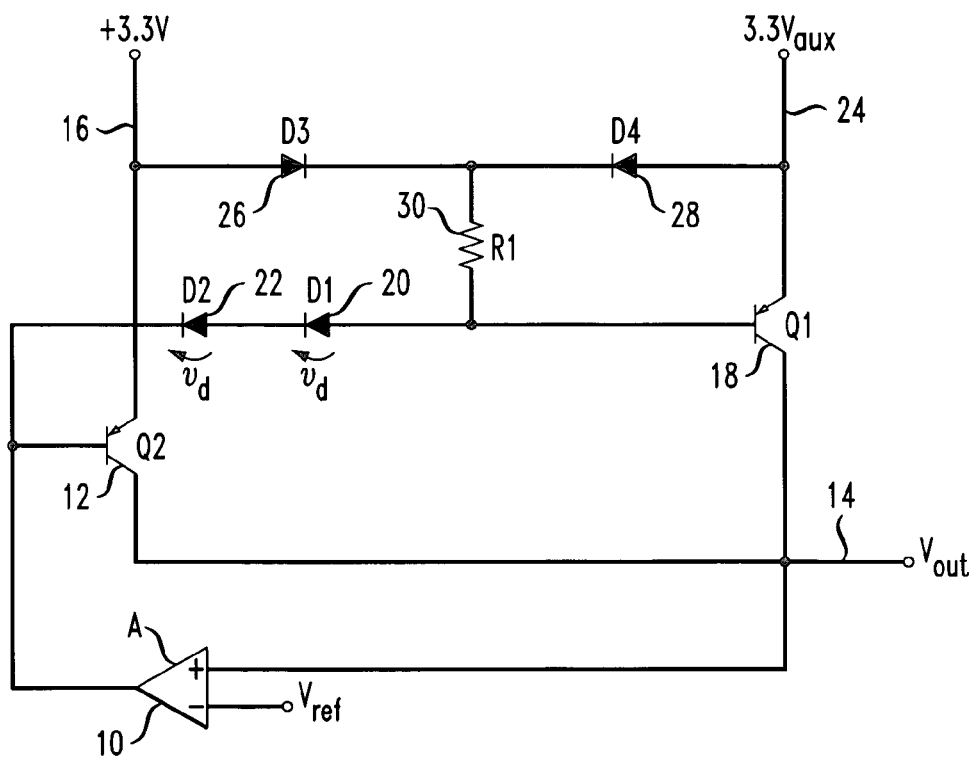
FIG. 2 is an alternative embodiment of the arrangement of FIG. 1 with additional elements utilized to provide temperature stability.
Figure 3:
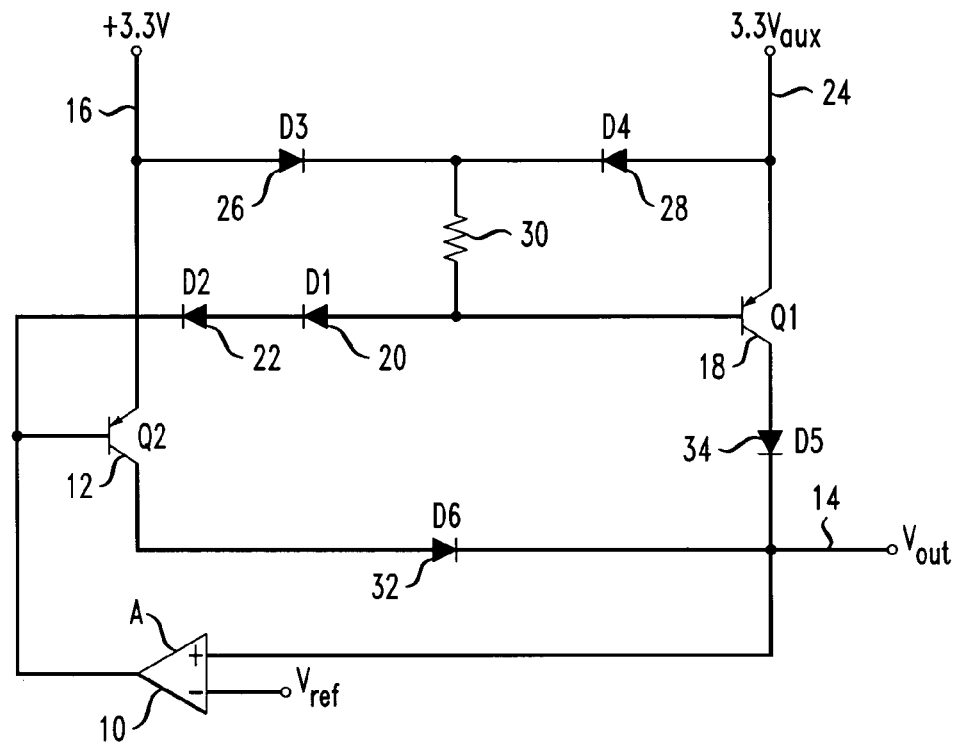
FIG. 3 illustrates yet a further variation of the present invention, incorporating a steering diode to prevent reverse current flow.

FIG. 2 illustrates an alternative embodiment of the present invention, with a second pair of diodes 26, 28 and resistor 30 added to provide for wide temperature stability, while also assuring that the leakage current through second transistor 18 will remain sufficiently low. It is to be understood that the addition of these components is not required in every application of the voltage regulation arrangement of the present invention. FIG. 3 contains a schematic of yet a further variation of the present invention, in this case adding a steering diode 32 to limit (prevent) reverse current flow from regulated output rail 14 and input rail 16. In the arrangement as illustrated in FIG. 3, diode 32 is coupled between the collector of first transistor 12 and output supply rail 14. Although diode 32 needs to carry the full current of the primary supply voltage, the drop across this element is not critical since it is compensated for by the normal function of the regulator arrangement. In some applications, if the system voltage levels are such that second transistor 18 may inadvertently be turned "on", a second diode 34 may be disposed between the collector of second transistor 18 and supply rail 14 to prevent reverse flow through 3.3 Vaux input supply rail 24.

Figure 4:
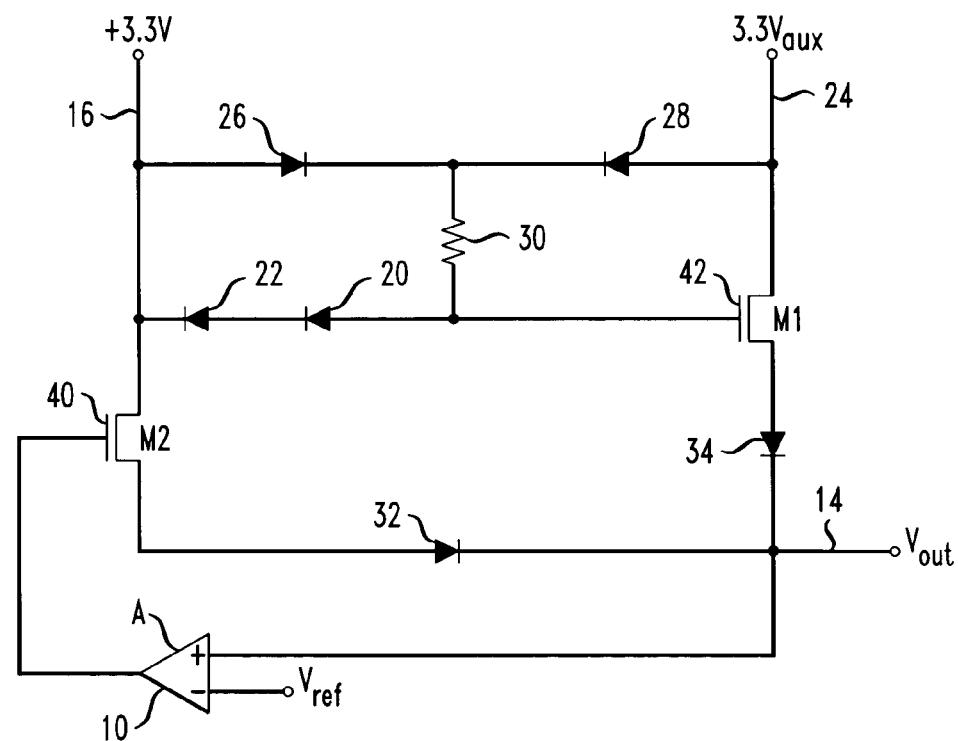
FIG. 4 contains an alternative embodiment of the present invention, formed using MOS devices.

As mentioned above, the voltage regulator of the present invention may be formed of MOS devices in place of bipolar devices. FIG. 4 illustrates an exemplary embodiment of the present invention formed using MOS devices 40 and 42 as first and second transistors, respectively. To mitigate the potential current flow from the regulated output through the MOSFET substrate (reverse) diode, both steering diodes 32 and 34 should be used. Remaining elements 20, 22, 26, 28 and 30 function in a similar manner as discussed above in association with FIGS. 1-3. Inasmuch as the threshold voltages associated with MOS devices may be different than those for bipolar devices, the particular diodes selected for use in this embodiment (in terms of voltage drop) may be different than those preferred for use with the bipolar embodiment of FIGS. 1-3.

It is to be understood that various modifications may be made to the present invention in light of the above detailed description. The terms used in the following claims should not be construed to limit the invention to the specification embodiments disclosed in the specification and claims. Rather, the scope of the present invention is to be determined entirely by the following claims, which are to be construed in accordance with established doctrines of claim interpretation.

What is claimed is:

1. A voltage regulator switch mechanism comprising:
   a first pass transistor, having a control terminal, and coupled between a first power supply node and an output node;
   a second pass transistor, having a control terminal, and coupled between a second power supply node and the output node;
   a differential amplifier having an input coupled to the output node and an output coupled to the control terminal of the first pass transistor; and
   a voltage dropping circuit connected between the output of the amplifier and the second pass transistor control terminal for switching between the first power supply node and the second supply node when the value of the first power supply drops below the value associated with the voltage dropping circuit such that the voltage dropping circuit turns on the second pass transistor.

2. The voltage regulator switch mechanism of claim 1, wherein the voltage dropping circuit comprises at least one series-coupled diode.

3. The voltage regulator switch mechanism of claim 2, wherein the voltage dropping circuit comprises a pair of series-coupled diodes.

4. The voltage regulator switch mechanism of claim 1, wherein the first and second pass transistors comprise bipolar devices.

5. The voltage regulator switch mechanism of claim 1, wherein the first and second pass transistors comprise MOS devices.

6. The voltage regulator switch mechanism of claim 1, wherein the switch mechanism further comprises a temperature stability arrangement comprising
   a "T" network of a pair of steering diodes and a resistive element coupled between the first and second input nodes and the control terminal of the second pass transistor.

7. The voltage regulator switch mechanism of claim 1, wherein the switch mechanism further comprises a protection diode coupled between the second pass transistor and the output node.

8. The voltage regulator switch mechanism of claim 1, wherein the switch mechanism further comprises a protection diode coupled between the first pass transistor and the output node.

9. The voltage regulator switch mechanism of claim 1, wherein the switch mechanism further comprises
   a first protection diode coupled between the first pass transistor and the output node; and
   a second protection diode coupled between the second pass transistor and the output node.

* * * * *